(12) United States Patent
Zhang

(10) Patent No.: US 10,793,080 B2
(45) Date of Patent: Oct. 6, 2020

(54) ELECTRIC HOLDER

(71) Applicant: SHENZHEN NEARBYEXPRESS TECHNOLOGY DEVELOPMENT COMPANY LIMITED, Shenzhen, Guangdong (CN)

(72) Inventor: Shuai Zhang, Shenzhen (CN)

(73) Assignee: SHENZHEN NEARBYEXPRESS TECHNOLOGY DEVELOPMENT COMPANY LIMITED, Shenzhen (CN)

( * ) Notice: Subject to any disclaimer, the term of this patent is extended or adjusted under 35 U.S.C. 154(b) by 9 days.

(21) Appl. No.: 16/069,155

(22) PCT Filed: Jan. 12, 2018

(86) PCT No.: PCT/CN2018/072312
§ 371 (c)(1),
(2) Date: Jul. 10, 2018

(87) PCT Pub. No.: WO2018/171304
PCT Pub. Date: Sep. 27, 2018

(65) Prior Publication Data
US 2019/0283685 A1    Sep. 19, 2019

(30) Foreign Application Priority Data
Mar. 22, 2017  (CN) .......................... 2017 1 0172713

(51) Int. Cl.
*F16M 11/00*    (2006.01)
*B60R 11/02*    (2006.01)
*F16M 11/04*    (2006.01)
*H04B 1/08*    (2006.01)
*H04B 1/3877*    (2015.01)
(Continued)

(52) U.S. Cl.
CPC ............. *B60R 11/02* (2013.01); *F16M 11/04* (2013.01); *H04B 1/082* (2013.01); *H04B 1/3877* (2013.01); *H04M 1/04* (2013.01); *H04M 1/72527* (2013.01); *B60R 2011/0005* (2013.01); *B60R 2011/0071* (2013.01); *B60R 2011/0075* (2013.01); *F16M 2200/02* (2013.01)

(58) Field of Classification Search
CPC .... H05K 7/1401; H05K 5/0017; H03K 17/96; F16B 2/12
USPC ...................... 248/316.1, 316.2, 316.4, 316.6
See application file for complete search history.

(56) References Cited

U.S. PATENT DOCUMENTS 10,492,322 B1*  11/2019  Fan ......................... H03K 17/96
2018/0266457 A1*  9/2018  Du ....................... B60R 11/0241
(Continued)

FOREIGN PATENT DOCUMENTS

CN           1262833 A      8/2000
CN         204095689 U      1/2015
(Continued)

*Primary Examiner* — Steven M Marsh
(74) *Attorney, Agent, or Firm* — Metis IP LLC

(57) ABSTRACT

Provided is an electric holder. The electric holder includes a shell and a pair of clamping arms. The electric holder also includes: a linkage mechanism that forms a linkage connection with at least one clamping arm of a pair of clamping arms; an electric driving apparatus that forms a linkage connection with the linkage mechanism; a control unit coupled to the electric driving apparatus; and at least one trigger unit coupled to the control unit.

20 Claims, 9 Drawing Sheets

(51) Int. Cl.
*H04M 1/04* (2006.01)
*H04M 1/725* (2006.01)
*B60R 11/00* (2006.01)

(56) References Cited

U.S. PATENT DOCUMENTS

| | | | | |
|---|---|---|---|---|
| 2019/0249697 A1* | 8/2019 | Liu | .................... | H02J 7/025 |
| 2020/0018334 A1* | 1/2020 | Le Mon | .................... | B25B 5/085 |
| 2020/0024492 A1* | 1/2020 | Difonzo | .................... | C09J 11/04 |
| 2020/0030191 A1* | 1/2020 | Santillan | .................... | F16B 2/005 |
| 2020/0031622 A1* | 1/2020 | Ferri | .................... | E01B 9/66 |

FOREIGN PATENT DOCUMENTS

| | | |
|---|---|---|
| CN | 204210394 U | 3/2015 |
| CN | 106427810 A | 2/2017 |
| CN | 106764289 A | 5/2017 |
| CN | 106764295 A | 5/2017 |
| CN | 206626339 U | 11/2017 |
| EP | 2975488 A1 | 1/2016 |
| WO | 2015115192 A1 | 8/2015 |

\* cited by examiner

ELECTRIC HOLDER

CROSS-REFERENCE TO RELATED APPLICATIONS

This application is a national stage application under 35 U.S.C. 371 based on application PCT/CN2018/072312, which claims the benefit of and priority to China Application No. 201710172713.X, filed on Mar. 22, 2017, the disclosures of which are expressly incorporated herein by reference in their entirety.

TECHNICAL FIELD

The present application relates to the technical field of holders, and for example, relates to an electric holder.

BACKGROUND

With popularization of personal mobile terminal devices and increasing improvement of functions thereof such as communication, navigation and multimedia, the personal mobile terminal devices, especially mobile phones, are gradually becoming indispensable articles in human life. When a user needs to use the mobile phone while driving, how to fix the mobile phone is an urgent problem for security reasons.

In the related art, when the user uses fixes a to-be-fixed article to the holder, the user usually needs to hold the article with one hand and open the holder with the other hand; and when the user picks up the article fixed to the holder, the user needs to pull out the article. These actions are unsafe during driving. In addition, while the user enjoys convenience brought by the mobile phone and automobiles, some complex operations are introduced and use experience of the user is reduced.

SUMMARY

The present application provides an electric holder, which is capable of clamping or stretching clamping arms without a need of manually moving the clamping arms by a user, so as to enhance safety and convenience of using the electric holder during driving for the user.

An embodiment provides an electric holder, which includes:
  a shell;
  a pair of clamping arms;
  a linkage mechanism that forms a linkage connection with at least one clamping arm of a pair of clamping arms;
  an electric driving apparatus that forms a linkage connection with the linkage mechanism;
  a control unit coupled to the electric driving apparatus; and
    at least one trigger unit coupled to the control unit,
    when the trigger unit is triggered, the control unit controls the electric driving apparatus to drive the linkage mechanism so as to move least one clamping arm of the pair of clamping arms.

Optionally, the electric holder includes one trigger unit; when the trigger unit is triggered for odd/even-numbered times, the control unit controls the electric driving apparatus to drive the linkage mechanism positively, so as to move at least one clamping arm of the pair of clamping arms inwards; and when the trigger unit is triggered for even/odd-numbered times, the control unit controls the electric driving apparatus to drive the linkage mechanism reversely, so as to move at least one clamping arm of the pair of clamping arms outwards.

Optionally, the electric holder includes two trigger units; when one of the trigger units is triggered, the control unit controls the electric driving apparatus to drive the linkage mechanism positively, so as to move at least one clamping arm of the pair of clamping arms inwards; and when the other one of the trigger units is triggered, the control unit controls the electric driving apparatus to drive the linkage mechanism reversely, so as to move at least one clamping arm of the pair of clamping arms outwards.

Optionally, one of the trigger units is located on a supporting surface of the shell, and the other one of the trigger units is located on a surface of the shell other than the supporting surface.

Optionally, the electric holder includes three trigger units; when one of the trigger units is triggered, the control unit controls the electric driving apparatus to drive the linkage mechanism positively, so as to move at least one clamping arm of the pair of clamping arms inwards; and when the other two of the trigger units are simultaneously triggered, the control unit controls the electric driving apparatus to drive the linkage mechanism reversely, so as to move at least one clamping arm of the pair of clamping arms outwards.

Optionally, one of the trigger units is located on a supporting surface of the shell, and the other two of the trigger units are respectively located on two side surfaces of the shell which are separated with a small distance.

Optionally, the control unit judges whether the trigger unit fails and controls the electric holder to enter different operating modes.

Optionally, the electric holder also includes a base connected to the shell, and the control unit and/or the trigger unit is arranged in the base.

Optionally, the linkage mechanism includes a gear; a first clamping arm of a pair of clamping arms includes a first clamping part and a first connecting part connected to the first clamping part; a first accommodating groove is formed at one end of the first connecting part away from the first clamping part; the first accommodating groove has a first side surface; the first side surface has a toothed shape and engages with the gear.

Optionally, a second clamping arm of a pair of clamping arms includes a second clamping art and a second connecting part connected to the second clamping part; a second accommodating groove is formed at one end of the second connecting part away from the second clamping part; the second accommodating groove has a second side surface opposite to the first side surface; and the second side surface has a tooth shape and engages with the gear.

Optionally, the first connecting part is provided with a limiting part.

Optionally, the second connecting part is provided with a limiting part

Optionally, when the pair of clamping arms moves outwards or inwards to reach a limit or to clamp a to-be-fixed article, the control unit controls the electric driving apparatus to stop driving.

Optionally, the control unit includes:
  a current sampling subunit configured to samples an operating current of the electric driving apparatus; and
  a drive control subunit configured to control the electric driving apparatus to stop driving when the operating current is greater than a preset threshold.

Optionally, the electric holder also includes an input unit and an output unit; the output unit is selected from a group consisting: a USB interface, a magnetic attraction joint, a wireless charging coil.

Optionally, the electric holder also includes a fixing and supporting part; the fixing and supporting part is arranged on a bottom end of the shell and is movably connected to the shell, the output unit is an output connector arranged on the fixing and supporting part.

Optionally, the electric holder also includes a power supply unit; the power supply unit individually provides electric energy for the control unit, the electric driving apparatus and the trigger unit.

The electric holder in the present application takes use of the trigger unit to judge whether a user want to fix a mobile terminal device or take out the mobile terminal device, conducts positive or reverse driving to drive the clamping arms to retract or stretch, thereby clamping or releasing the mobile terminal device and realizing intelligent driving of the clamping arms. The electric holder in the present application is simple in operation and easy in one-hand operation. In a process of clamping or releasing the mobile terminal device, the user does not need to move the clamping arms manually, thereby realizing high intelligent degree and automation degree and enhancing safety and convenience of using the electric holder during driving for the user.

DETAILED DESCRIPTION

The present application is described below in detail with reference to drawings and embodiments.

In embodiments of the present invention, when an element is regarded to be "fixed to" another element, the element may be directly on another element or an intermediate element exists. When an element is considered to be "connected to" another element, the element may be directly connected to another element or an intermediate element simultaneously exists. Terms "vertical", "horizontal", "left", "right", "positive", "reverse", "first" or "second" and similar statements used in the present application are only for description.

Unless otherwise defined, all technical and scientific terms used in the present application have the same meanings as those generally understood by those skilled in the art. The terms used in the present application are only for a purpose of describing specific embodiments, not used for limiting the present application. Term "and/or" used in the present application includes any and all of combinations of one or more relevant listed items.

An electric holder provided in the present application can be applied to different scenarios, such as on-board holder, tabletop holder or any other occasions that need clamping an article. The article which can be clamped include, but not limited to, a mobile phone, a tablet computer, an e-book reader and a navigator. The following embodiments are described by taking an on-board holder for clamping a mobile terminal device as an example.

Figure 1:
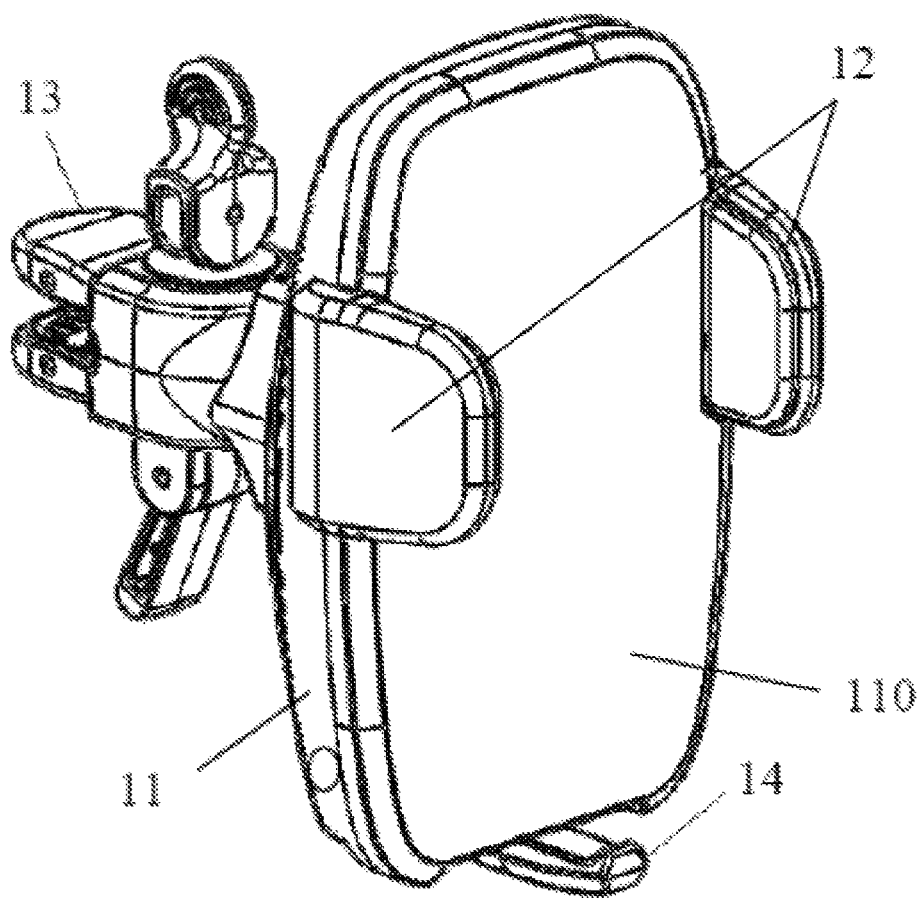
FIG. 1 is a three-dimensional structural diagram illustrating an electric holder provided by an embodiment.

FIG. 1 is a three-dimensional structural diagram illustrating an electric holder provided by an embodiment. As shown in FIG. 1, the electric holder provided in the present embodiment includes a shell 11, a pair of clamping arms 12 and a base 13. The shell 11 has a supporting surface 110 for supporting an article, which may be a mobile terminal device. By taking the supporting surface 110 as a front surface, the pair of clamping arms 12 respectively extends from both sides of the shell 11; and the base 13 is rotatably connected to a back surface of the shell 11. When the mobile terminal device is fixed to the electric holder, a back surface of the mobile terminal device comes into contact with the supporting surface 110 of the shell 11 and is clamped by the clamping arms 12 from both sides. The base 13 is used to fix the electric holder into a vehicle. In the present embodiment, the base 13 may be fixed to a vent of an air conditioner in the vehicle.

Optionally, the electric holder also includes a fixing and supporting part 14 arranged on a bottom end of the shell 11. The fixing and supporting part 14 and the pair of clamping arms 12 together fix the mobile terminal device. Under a condition that the clamping arms 12 are stretched and a user fails to hold the mobile terminal device steadily, the fixing and supporting part 14 can effectively prevent the mobile terminal device from falling from the electric holder.

In other embodiments, the base 13 of the electric holder may be a sucker-type base or a base in any other types for fixing the electric holder to a position such as on an automobile dashboard, a center console, windshield and the like. In addition, the fixing and supporting part 14 may also has a plate shape or other shapes, and the fixing and supporting part 14 may be fixedly or movably connected to the shell 11. In the case of fixed connection, the fixing and supporting part 14 cannot move in a horizontal plane or a vertical plane relative to the shell 11. In the case of movable connection, the fixing and supporting part 14 can slide in the horizontal plane or rotate in the vertical plane relative to the shell 11. The present application does not limit the quantity and shape of the fixing and supporting part 14, as well as the manner in which the fixing and supporting part 14 is connected to the shell 11.

Figure 2:
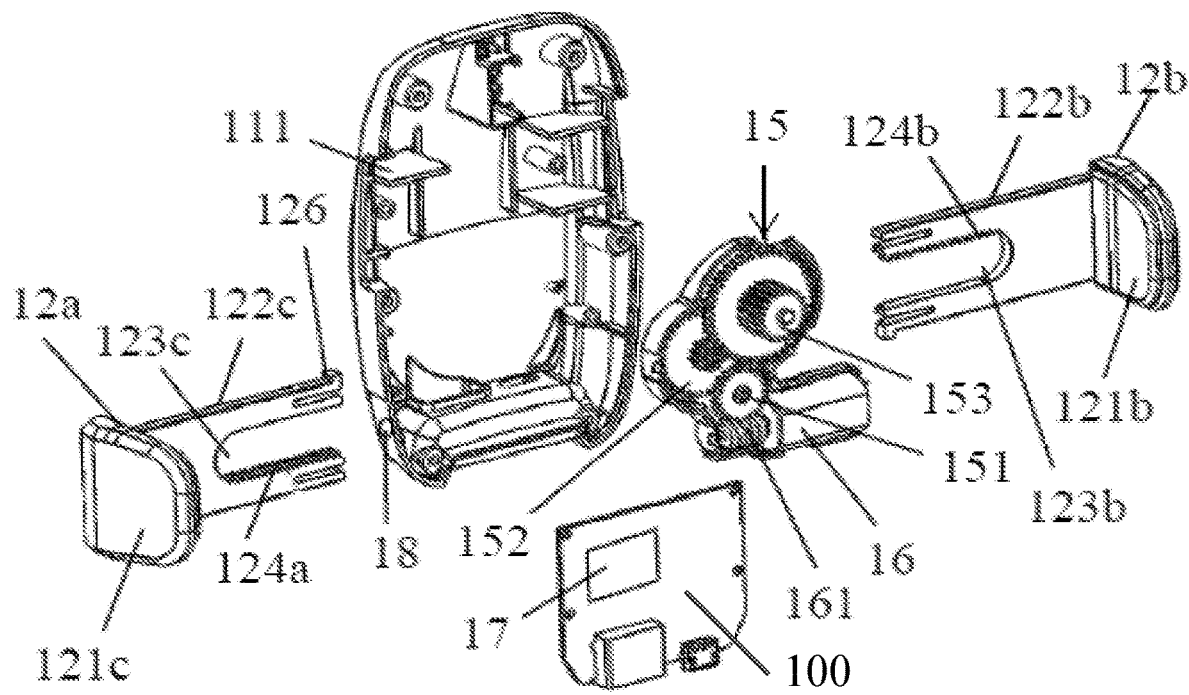
FIG. 2 is a three-dimensional exploded diagram illustrating an electric holder after removal of a supporting surface of a shell shown in FIG. 1.

FIG. 2 is a three-dimensional exploded diagram illustrating an electric holder after removal of the supporting surface 110 of the shell 11 in an embodiment shown in FIG. 1. As shown in FIG. 2, the electric holder in the present embodiment may also include a linkage mechanism 15, an electric driving apparatus 16, a control unit 17 and a trigger unit 18. The linkage mechanism 15 forms a linkage connection with at least one clamping arm of a pair of clamping arms 12. The electric driving apparatus 16 forms a linkage connection with the linkage mechanism 15. The control unit 17 is coupled to the electric driving apparatus 16. The trigger unit 18 is coupled to the control unit 17. When the trigger unit 18 is triggered, the control unit 17 controls the electric driving apparatus 16 to drive the linkage mechanism 15, so as to move at least one clamping arm of the pair of clamping arms 12 that forms the linkage connection with the linkage mechanism, thereby realizing clamping and stretching actions of the pair of clamping arms 12.

Specifically, when the trigger unit 18 is triggered, the trigger unit 18 sends a trigger signal to the control unit 17. The control unit 17 receives the trigger signal and sends a control signal to the electric driving apparatus 16 so as to control the electric driving apparatus 16 to operate and further drive the linkage mechanism 15. This makes at least one clamping arm 12 that forms the linkage connection with the linkage mechanism 15 moves with the movement of the linkage mechanism 15.

In the present embodiment, the control unit 17 is arranged on a printed circuit board 100, and is electrically connected to the electric driving apparatus 16 and the trigger unit 18 respectively. The electric driving apparatus 16 may be a stepper servomotor or a micro motor or other motors having identical functions as long as a driving torque can be generated and positive rotation and reverse rotation can be realized. The electric driving apparatus 16 has a worm 161. The linkage mechanism 15 is a gear set. The gear set includes a first gear 151, a second gear 152 and a third gear 153, which are dual-layer gears. In other words, each gear includes a large gear and a small gear which are connected coaxially. In an embodiment, the large gear of the first gear 151 engages with the worm 161 of the electric driving apparatus 16; the large gear of the second gear 152 engages with the small gear of the first gear 151; and the large gear of the third gear 153 engages with the small gear of the second gear 152.

Two clamping arms 12 of the electric holder are respectively a first clamping arm 12*a* and a second clamping arm 12*b*. The first clamping arm 12*a* includes a first clamping part 121*c* and a first connecting part 122*c* connected to the first clamping part 121*c*. A first accommodating groove 123*c* is formed at one end of the first connecting part 122*c* away from the first clamping part 121*c*. The second clamping arm 12*b* includes a second clamping part 121*b* and a second connecting part 122*b* connected to the second clamping part 121*b*. A second accommodating groove 123*b* is formed at one end of the second connecting part 122*b* away from the second clamping part 121*b*. The first accommodating groove 123*c* has a first side surface 124*a* with a tooth shape inside the first accommodating groove 123*c*. A side, in the second accommodating groove 123*b* has a second side surface 124*b* which is inside the second accommodating groove 123*b* and is opposite to the first side surface 124*a*. The second side surface 124*b* also has a tooth shape.

The first side surface 124*a* of the first clamping arm 12*a* and the second side surface 124*b* of the second clamping arm 12*b* each engages with the small gear of the third gear 153. When the worm 161 rotates, the worm 161 drives the first gear 151 to rotate and further drives the second gear 152 to rotate; the second gear 152 then drives the third gear 153 to rotate; and finally the third gear 153 drives the first clamping arm 12*a* and the second clamping arm 12*b* to simultaneously move in opposite directions. For example, the first clamping arm 12*a* and the second clamping arm 12*b* simultaneously move towards each other or simultaneously move away from each other. In this way, a linkage connection is formed among the electric driving apparatus 16, the linkage mechanism 15 and the clamping arms.

Limiting parts 126 are respectively arranged on the end of the first connecting part 122*c* away from the first clamping part 121*a* and the end of the second connecting part 122*b* away from the second clamping part 121*b*, and are configured to limit the distance of the movement of the first clamping arm 12*a* and the second clamping arm 12*b* away from each other. In the present embodiment, the limiting parts 126 are barbs. A stopping part 111 is arranged at an inner side of a side wall of the shell 11. When the first clamping arm 12*a* and the second clamping arm 12*b* move away from each other, the limiting parts 126 finally engages with the stopping part 111 so that the first clamping arm 12*a* and the second clamping arm 12*b* cannot continue to move away from each other, i.e., the clamping arms 12 are stretched to a maximum limit.

Optionally, the worm 161 and the first gear 151 forms a self-locking structure. According to a self-locking principle, when a lead angle of the worm is less than an equivalent angle of friction between engaged gear teeth, the worm has the property of self-locking and can realize reverse self-locking. Namely, only the worm 161 drives the first gear 151 to rotate and the first gear 151 cannot drive the worm 161 to rotate, thereby ensuring that the clamping arms 12 can only be driven by the electric driving apparatus 16 through the linkage mechanism 15 and the electric driving apparatus 16 is not driven by the clamping arms 12 and the linkage mechanism 15. Therefore, under a condition that the electric driving apparatus 16 is not used for driving, even if the electric holder shakes violently or the user pushes the clamping arms 12 inwards or pulles the clamping arms 12 outwards with hands, the clamping arms 12 will not move. In this way, when the clamping arms 12 clamp the mobile terminal device, the clamping arms 12 are not loosened due to shake or accidental touch of the clamping arms 12, thereby preventing the mobile terminal device from falling.

In the present embodiment, the number of the trigger unit 18 is one. When the trigger unit 18 is triggered for odd-numbered times, i.e., the trigger unit 18 is triggered for a first time, a third time, a fifth time and the like, the control unit 17 controls the electric driving apparatus 16 to drive the linkage mechanism 15 positively, so as to retract the pair of clamping arms 12; and when the trigger unit 18 is triggered for even-numbered times, i.e., the trigger unit 18 is triggered for a second time, a fourth time, a sixth time and the like, the control unit 17 controls the electric driving apparatus 16 to drive the linkage mechanism 15 reversely, so as to stretch the pair of clamping arms 12.

Optionally, when the trigger unit 18 is triggered for odd-numbered times, i.e., the trigger unit 18 is triggered for a first time, a third time, a fifth time and the like, the control unit 17 controls the electric driving apparatus 16 to drive the linkage mechanism 15 reversely, so as to stretch the pair of clamping arms 12; and when the trigger unit 18 is triggered for even-numbered times, i.e., the trigger unit 18 is triggered for a second time, a fourth time, a sixth time and the like, the control unit 17 controls the electric driving apparatus 16 to drive the linkage mechanism 15 positively, so as to retract the pair of clamping arms 12.

Specifically, whenever the trigger unit 18 is triggered, the trigger unit 18 sends a trigger signal to the control unit 17. A control signal sent by the control unit 17 at the time of receiving the trigger signal for an odd-numbered time is different from a control signal sent by the control unit 17 at the time of receiving the trigger signal for an even-numbered time. For example, when the trigger unit 18 is triggered for an odd-numbered time, the trigger unit 18 sends a trigger signal to the control unit 17. When the control unit 17 receives the trigger signal for the odd-numbered time, the control unit 17 sends a positive rotation signal to the electric driving apparatus 16. When the trigger unit 18 is triggered for an even-numbered time, the trigger unit 18 sends a trigger signal to the control unit 17. When the control unit 17 receives the trigger signal for the even-numbered time, the control unit 17 sends a reverse rotation signal to the electric driving apparatus 16. Alternatively, for example, when the trigger unit 18 is triggered for an even-numbered time, the trigger unit 18 sends a trigger signal to the control unit 17. When the control unit 17 receives the trigger signal for the even-numbered time, the control unit 17 sends a positive rotation signal to the electric driving apparatus 16. When the trigger unit 18 is triggered for an odd-numbered time, the trigger unit 18 sends a trigger signal to the control unit 17. When the control unit 17 receives the trigger signal for the odd-numbered time, the control unit 17 sends a reverse rotation signal to the electric driving apparatus 16. Once the electric driving apparatus 16 receives the positive rotation signal, the electric driving apparatus 16 starts to rotate positively and drive the linkage mechanism 15 to rotate positively, so that the first clamping arm 12a and the second clamping arm 12b move inwards, i.e., the first clamping arm 12a and the second clamping arm 12b move towards each other, thereby realizing an action of retracting the pair of clamping arms 12. When the electric driving apparatus 16 receives the reverse rotation signal, the electric driving apparatus 16 starts to rotate reversely and drive the linkage mechanism 15 to rotate reversely, so that the first clamping arm 12a and the second clamping arm 12b move outwards, i.e., the first clamping arm 12a and the second clamping arm 12b move away from each other, thereby realizing an action of stretching the pair of clamping arms 12.

In other embodiments, alternatively, a trigger signal sent by the trigger unit 18 to the control unit 17 at the time of being triggered for an odd-numbered time may be different from a trigger signal sent by the trigger unit 18 to the control unit 17 at the time of being triggered for an even-numbered time, so that the control unit 17 sends corresponding control signals according to different trigger signals. For example, when the trigger unit 18 is triggered for an odd-numbered time, the trigger unit 18 sends a retracting trigger signal to the control unit 17. When the control unit 17 receives the retracting trigger signal, the control unit 17 sends a positive rotation signal to the electric driving apparatus 16, so that the electric driving apparatus 16 rotates positively. When the trigger unit 18 is triggered for an even-numbered time, the trigger unit 18 sends a stretching trigger signal to the control unit 17. When the control unit 17 receives the stretching trigger signal, the control unit 17 sends a reverse rotation signal to the electric driving apparatus 16, so that the electric driving apparatus 16 rotates reversely. Alternatively, for example, when the trigger unit 18 is triggered for an odd-numbered time, the trigger unit 18 sends a stretching trigger signal to the control unit 17. When the control unit 17 receives the stretching trigger signal, the control unit 17 sends a reverse rotation signal to the electric driving apparatus 16, so that the electric driving apparatus 16 rotates reversely. When the trigger unit 18 is triggered for an even-numbered time, the trigger unit 18 sends a retracting trigger signal to the control unit 17. When the control unit 17 receives the retracting trigger signal, the control unit 17 sends a positive rotation signal to the electric driving apparatus 16, so that the electric driving apparatus 16 rotates positively.

Optionally, the trigger unit 18 is arranged on the side surface of the shell 11. In view of the fact that the user generally holds the mobile terminal device with a thumb and other fingers of one hand at the time of taking the mobile terminal device, the trigger unit 18 is arranged on the side surface of the shell 11. The trigger unit 18 may be triggered by a finger of the user while the user holds the mobile terminal device. Therefore, the operation is convenient and conforms to a use habit of the user. Optionally, the trigger unit 18 is arranged in a position between the clamping arms 12 and the bottom end of the shell 11, which further conforms to the use habit of the user. Moreover, when the user takes the mobile terminal device, the user can hold a lower half part of the mobile terminal device, thereby effectively preventing the mobile terminal device from sliding from the hand.

In other embodiments, as long as the trigger unit 18 is coupled to the control unit 17, the arrangement position of the trigger unit 18 is not limited to the side surface of the shell 11. The trigger unit 18 may be arranged on other surfaces of the shell 11, and may also be arranged on the clamping arms 12 or the fixing and supporting part 14. In addition, for a single trigger unit 18, considering the use habit of the user, the trigger unit 18 is optionally arranged on a surface other than the supporting surface 110 of the electric holder.

In other embodiments, when the base 13 is a sucker-type base or other fixing bases with an inner cavity, as long as the control unit 17 is coupled to the electric driving apparatus 16 and the trigger unit 18 (e.g., electrical connection through wires), the trigger unit 18 may be arranged in the base 13 individually or together with the control unit 17. In this way, only the electric driving apparatus 16 and the linkage mechanism 15 are reserved in the shell 11, so that the shell 11 can be designed to have a small volume and a delicate appearance without cumbersomeness.

In other embodiments, the linkage mechanism 15 may be a single gear (e.g., only one gear which simultaneously engages with the worm 161 and the first clamping arm 12a), or may be a gear set including two or more gears. The gear may be a single-layer gear. As long as the overall arrangement of the clamping arms 12, the linkage mechanism 15 and the electric driving apparatus 16 is adjusted, the linkage between the clamping arms 12 and the electric driving apparatus 16 can be realized.

In other embodiments, the limiting parts 126 may also be respectively arranged at openings of the first accommodating groove 123c and the second accommodating groove 123b to form closed through holes with the accommodating grooves. The first gear moves in the through holes. When the first gear abuts against the limiting parts 126, the clamping arms 12 stop moving without a need of adding stopping parts corresponding to the limiting parts 126 in the shell 11.

In the electric holder in the present application, as long as the trigger unit 18 is touched slightly, the clamping arms 12 of the electric holder automatically stretch or clamp. Therefore, the operation is convenient and it is easy to operate with a single hand, achieving a high intelligent degree and a high automation degree. In addition, in the electric holder in the present application, a motor is used to drive the clamping arms 12 to retract at a constant speed without damaging the clamped mobile terminal device. However, in a common on-board holder, spring-type clamping arms are generally used. The impulse generated at a moment of clamping the mobile terminal device is often large; and it is easy to damage both sides of the terminal device.

Figure 3:
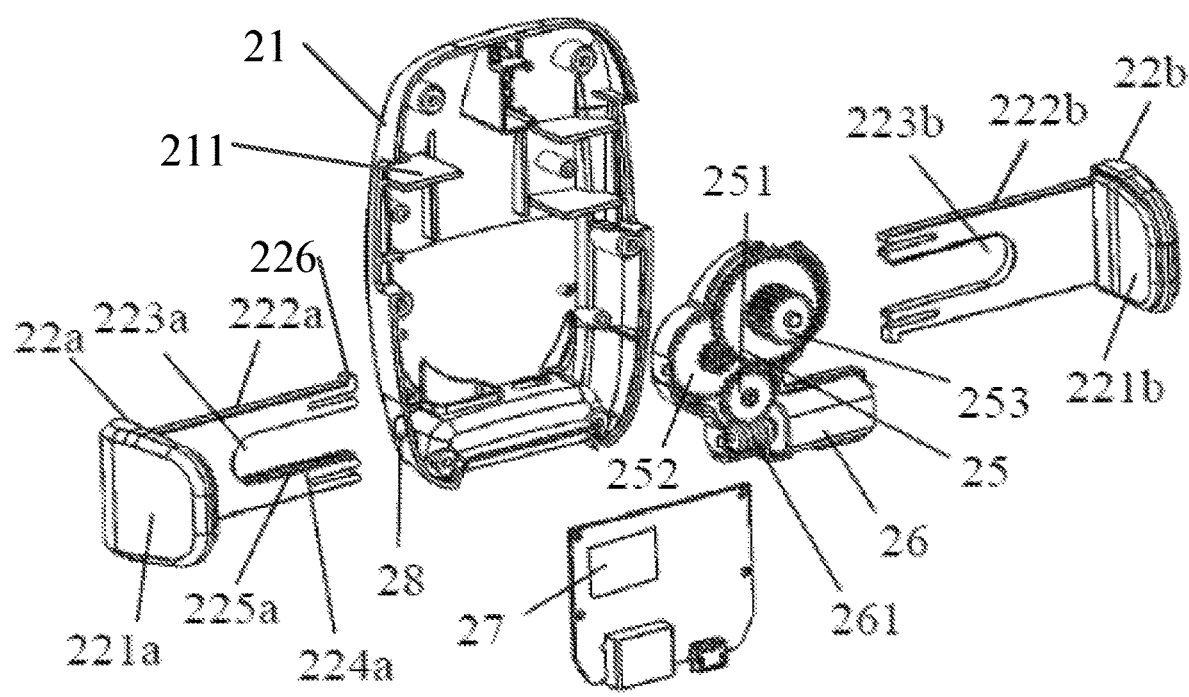
FIG. 3 is a three-dimensional exploded diagram illustrating an electric holder after removal of a supporting surface of a shell provided by another embodiment.

By referring to FIG. 3, FIG. 3 is a three-dimensional exploded diagram illustrating an electric holder after removal of a supporting surface 110 of a shell provided by another embodiment. As shown in FIG. 3, the electric holder provided in the present embodiment includes a shell 21, a first clamping arm 22a, a second clamping arm 22b, a linkage mechanism 25, an electric driving apparatus 26, a control unit 27 and a trigger unit 28. The first clamping arm 22a forms a linkage connection with the linkage mechanism 25. The second clamping arm 22b does not form a linkage connection with the linkage mechanism 25. When the trigger unit 28 is triggered, the control unit 27 controls the electric driving apparatus 26 to drive the linkage mechanism 25, so that the first clamping arm 22a linked to the linkage mechanism 25 moves, thereby realizing an action of clamping or stretching a pair of clamping arms 22a and 22b.

Specifically, the electric driving apparatus 26 includes a worm 261. The linkage mechanism 25 is a gear set. The gear set includes a first gear 251, a second gear 252 and a third gear 253. The first gear 251, the second gear 252 and the third gear 253 are dual-layer gears, i.e., each gear includes a large gear and a small gear which are connected coaxially. The large gear of the first gear 251 engages with the worm 261 of the electric driving apparatus 26. The large gear of the second gear 252 engages with the small gear of the first gear 251. The large gear of the third gear 253 engages with the small gear of the second gear 252.

The first clamping arm 22a includes a first clamping part 221a and a first connecting part 222a connected to the first clamping part 221a. A first accommodating groove 223a is formed at one end of the first connecting part 222a away from the first clamping part 221a. The first accommodating groove 223a has a first side surface 224a inside the first accommodating groove 223a. The first side surface 224a has a tooth shape and engages with the third gear 253.

When the worm 261 rotates, the worm 261 drives the first gear 251 to rotate and further drives the second gear 252 to rotate; the second gear 252 drives the third gear 253 to rotate; and finally the third gear 253 drives the first clamping arm 22a to move. In this way, a linkage connection is formed among the electric driving apparatus 16, the linkage mechanism 15 and the clamping arms 12.

A limiting part 226 is arranged on one end of the first connecting part 222a away from the first clamping part 221a, and is used to limit the distance of the movement of the first clamping arm 22a. In the present embodiment, the limiting part 226 is a barb. A stopping part 211 is arranged at an inner side of a side wall of the shell 21. When the first clamping arm 22a moves, the limiting part 226 finally engages with the stopping part 211, so that the first clamping arm 22a cannot continue to move along this direction.

The second clamping arm 22b is fixed relative to the shell 21 and includes a second clamping part 221b and a second connecting part 222b connected to the second clamping part 221b. A second accommodating groove 223b is formed at one end of the second connecting part 222b away from the second clamping part 221b. The second accommodating groove 223b does not have a side surface of a tooth shape inside the second accommodating groove 223b, and thus does not engage with the third gear 253. Although the third gear 253 is located in the second accommodating groove 223b, the third gear 253 does not drive the second clamping arm 22b to move.

In the present embodiment, the number of the trigger unit 28 is also one. Whenever the trigger unit 28 is triggered, the trigger unit 28 sends a trigger signal to the control unit 27. A control signal sent by the control unit 27 at the time of receiving the trigger signal for an odd-numbered time is different from a control signal sent by the control unit 27 at the time of receiving the trigger signal for an even-numbered time. For example, when the trigger unit 28 is triggered for an odd-numbered time, the trigger unit 28 sends a trigger signal to the control unit 27. When the control unit 27 receives the trigger signal for the odd-numbered time, the control unit 27 sends a positive rotation signal to the electric driving apparatus 26. When the trigger unit 28 is triggered for an even-numbered time, the trigger unit 28 sends a trigger signal to the control unit 27. When the control unit 27 receives the trigger signal for the even-numbered time, the control unit 27 sends a reverse rotation signal to the electric driving apparatus 26. Alternatively, for example, when the trigger unit 28 is triggered for an even-numbered time, the trigger unit 28 sends a trigger signal to the control unit 27. When the control unit 27 receives the trigger signal for the even-numbered time, the control unit 27 sends a positive rotation signal to the electric driving apparatus 26. When the trigger unit 28 is triggered for an odd-numbered time, the trigger unit 28 sends a trigger signal to the control unit 27. When the control unit 27 receives the trigger signal for the odd-numbered time, the control unit 27 sends a reverse rotation signal to the electric driving apparatus 26. When the electric driving apparatus 26 receives the positive rotation signal, the electric driving apparatus 26 starts to rotate positively and drive the linkage mechanism 25 to rotate positively, so that the first clamping arm 22a moves inwards, i.e., the first clamping arm 22a moves towards the second clamping arm 22b, thereby realizing an action of retracting the pair of clamping arms 22a and 22b. When the electric driving apparatus 26 receives the reverse rotation signal, the electric driving apparatus 26 starts to rotate reversely and drive the linkage mechanism 25 to rotate reversely, so that the first clamping arm 22a moves outwards, i.e., the first clamping arm 22a moves away from the second clamping arm 22b, thereby realizing an action of stretching the pair of clamping arms 22a and 22b.

In other embodiments, a trigger signal sent by the trigger unit 28 to the control unit 27 at the time of being triggered for an odd-numbered time may be different from a trigger signal sent by the trigger unit 28 to the control unit 27 at the time of being triggered for an even-numbered time, so that the control unit 27 sends corresponding control signals according to different trigger signals. For example, when the trigger unit 28 is triggered for an odd-numbered time, the trigger unit 28 sends a retracting trigger signal to the control unit 27; and when the control unit 27 receives the retracting trigger signal, the control unit 27 sends a positive rotation signal to the electric driving apparatus 26, so that the electric driving apparatus 26 rotates positively. When the trigger unit 28 is triggered for an even-numbered time, the trigger unit 28 sends a stretching trigger signal to the control unit 27; and when the control unit 27 receives the stretching trigger signal, the control unit 27 sends a reverse rotation signal to the electric driving apparatus 26, so that the electric driving apparatus 26 rotates reversely. Alternatively, for example, when the trigger unit 28 is triggered for an odd-numbered time, the trigger unit 28 sends a stretching trigger signal to the control unit 27; and when the control unit 27 receives the stretching trigger signal, the control unit 27 sends a reverse rotation signal to the electric driving apparatus 26, so that the electric driving apparatus 26 rotates reversely. When the trigger unit 28 is triggered for an even-numbered time, the trigger unit 28 sends a retracting trigger signal to the control unit 27; and when the control unit 27 receives the contracting trigger signal, the control unit 27 sends a positive rotation signal to the electric driving apparatus 26, so that the electric driving apparatus 26 rotates positively.

Optionally, the trigger unit 28 is arranged on the side surface of the shell 21. In view of the fact that the user generally holds the mobile terminal device with a thumb and other fingers of one hand at the time of taking the mobile terminal device, the trigger unit 28 is arranged on the side surface of the shell 21. The trigger unit 28 may be triggered by a finger of the user while the user holds the mobile terminal device. Therefore, the operation is convenient and conforms to a use habit of the user. Optionally, the trigger unit 28 is arranged in a position between the clamping arms 22 and the bottom end of the shell 21, which further conforms to the use habit of the user. Moreover, when the user takes the mobile terminal device, the user can hold a lower half part of the mobile terminal device, thereby effectively preventing the mobile terminal device from sliding from the hand.

In other embodiments, since the second clamping arm 22b is fixed, the second clamping arm 22b actually does not need to have a same structure as the first clamping arm 22a, and may be a fixed arm which is integrally formed with the shell 21. Thus, the connecting part is not necessary, and only the clamping part fixed to the shell 21 needs to be reserved.

Figure 4:
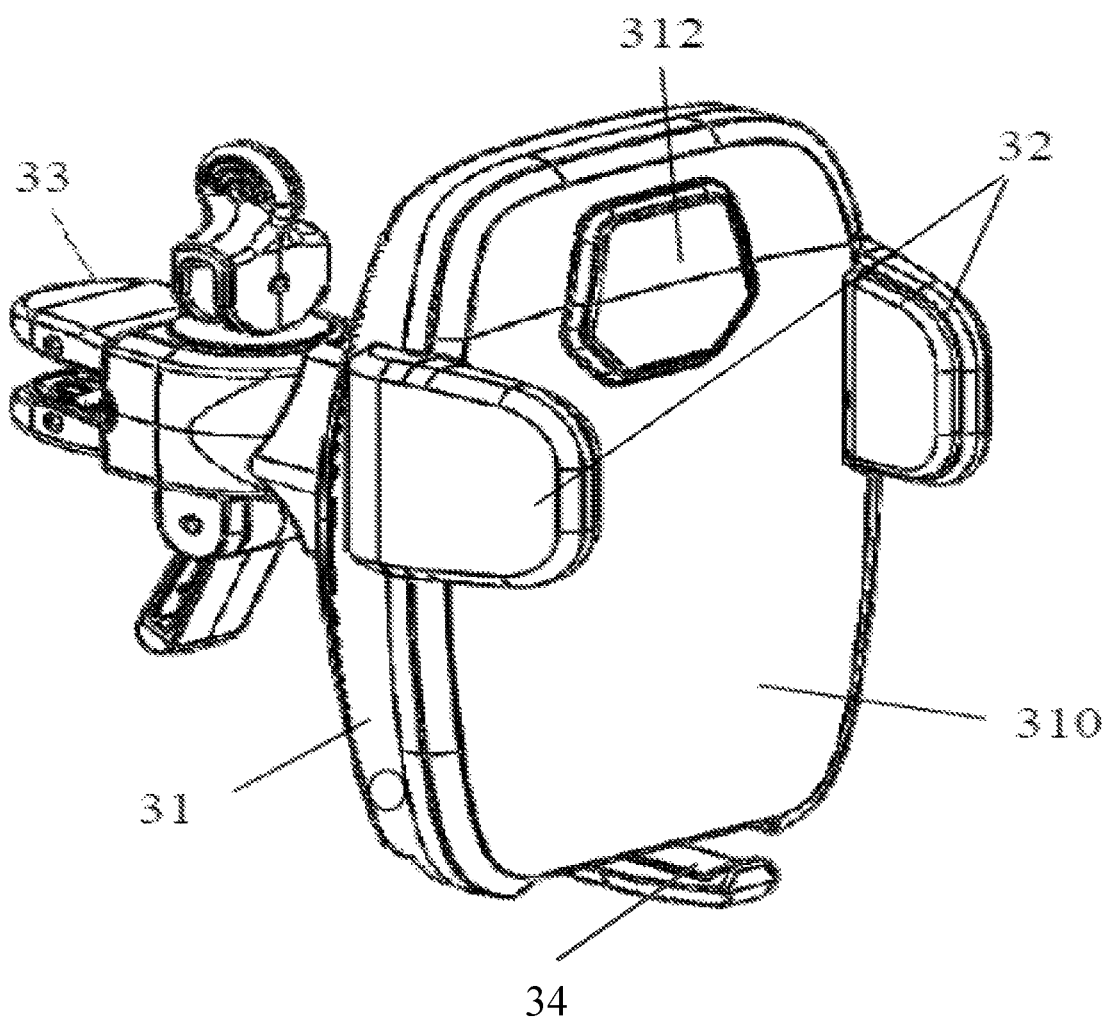
FIG. 4 is a three-dimensional structural diagram illustrating an electric holder provided by another embodiment.

By referring to FIG. 4, FIG. 4 is a three-dimensional structural diagram illustrating an electric holder provided by another embodiment in the present application. As shown in FIG. 4, the electric holder provided in the present embodiment includes a shell 31, a pair of clamping arms 32, a base 33 and a fixing and supporting part 34. The shell 31 has a supporting surface 310 for supporting an article. A raised movable block 312 is arranged in a region close to an upper part relative to the center of the supporting surface 310. The movable block 312 may move back and forth along a direction perpendicular to the supporting surface 310.

Figure 5:
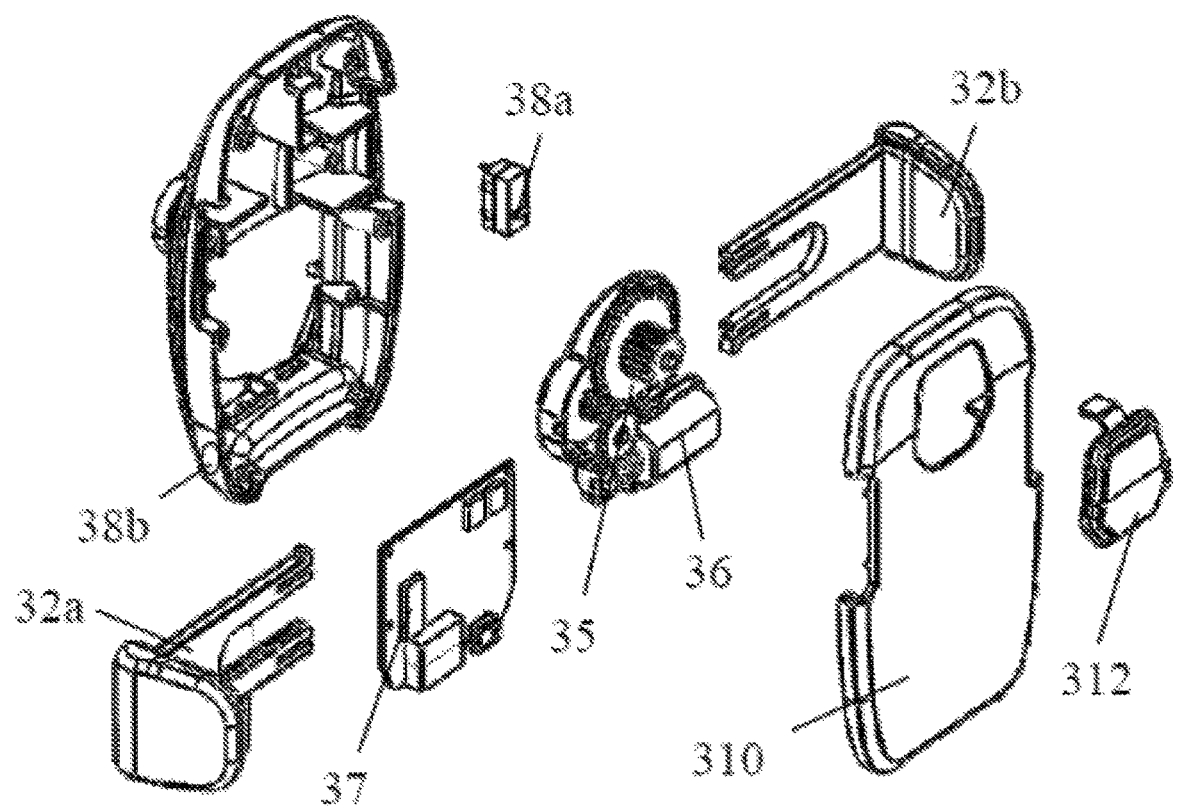
FIG. 5 is a three-dimensional exploded diagram illustrating an electric holder shown in FIG. 4.

By referring to FIG. 5, FIG. 5 is a three-dimensional exploded diagram illustrating an electric holder in an embodiment shown in FIG. 4. As shown in FIG. 5, the electric holder in the present embodiment also includes a linkage mechanism 35, an electric driving apparatus 36, a control unit 37 and trigger units 38. The electric driving apparatus 36 forms a linkage connection with the linkage mechanism 35. The control unit 37 is coupled to the electric driving apparatus 36. The trigger units 38 are coupled to the control unit 37. The number of the trigger units 38 is two, i.e., a first trigger unit 38a and a second trigger unit 38b. Two clamping arms of the electric holder are respectively a first clamping arm 32a and a second clamping arm 32b. The first clamping arm 32a and the second clamping arm 32b each forms a linkage connection with the linkage mechanism 35.

It can be understood that as long as the linkage connection between the electric driving apparatus 36 and the linkage mechanism 35 and the linkage connection between the linkage mechanism 35 and the clamping arms 32 are formed, the linkage mechanism 35 may be a single gear or may be a gear set including two or more gears. Each gear may be a single-layer gear or a dual-layer gear. As long as an effect of clamping the mobile terminal device can be achieved, only one clamping arm in the first clamping arm 32a and the second clamping arm 32b (e.g., the first clamping arm 32a) forms the linkage connection with the linkage mechanism 35, while the second clamping arm 32b is fixed to the shell 31 and is not repeated herein.

When the first trigger unit 38a is triggered, the control unit 37 controls the electric driving apparatus 36 to drive the linkage mechanism 35 positively, so that the first clamping arm 32a and the second clamping arm 32b move inwards, i.e., a pair of clamping arms 32 are retracted. When the second trigger unit 38b is triggered, the control unit 37 controls the electric driving apparatus 36 to drive the linkage mechanism 35 reversely, so that the first clamping arm 32a and the second clamping arm 32b move outwards, i.e., the pair of clamping arms 32 are stretched.

Specifically, when the first trigger unit 38a is triggered, the first trigger unit 38a sends a trigger signal to the control unit 37. The control unit 37 receives the trigger signal and sends a positive rotation signal to the electric driving apparatus 36. The electric driving apparatus 36 receives the positive rotation signal and starts to rotate positively to drive the linkage mechanism 35 to rotate positively, so as to drive the first clamping arm 32a and the second clamping arm 32b, which are linked to the linkage mechanism 35, to move inwards, i.e., the first clamping arm 32a and the second clamping arm 32b move towards each other. When the second trigger unit 38b is triggered, the second trigger unit 38b sends a trigger signal to the control unit 37. The control unit 37 receives the trigger signal and sends a reverse rotation signal to the electric driving apparatus 36. The electric driving apparatus 36 receives the reverse rotation signal and starts to rotate reversely to drive the linkage mechanism 35 to rotate reversly, so as to drive the first clamping arm 32a and the second clamping arm 32b, which are linked to the linkage mechanism 35, to move outwards, i.e., the first clamping arm 32a and the second clamping arm 32b move away from each other.

In the present embodiment, the first trigger unit 38a may be a touch switch (a touch pressure switch) and is arranged corresponding to the movable block 312. When a force in the direction of the back surface of the shell 31 is applied on the movable block 312, the movable block 312 moves towards the back surface of the shell 31, abuts against and presses the first trigger unit 38a, so as to trigger the first trigger unit 38a. When the user needs to fix the mobile terminal device, the user may directly place the mobile terminal device on the supporting surface 310, and press the movable block 312 by applying a force by hand or through the weight of the mobile terminal device, so as to trigger the first trigger unit 38a, thereby automatically retracting the clamping arms 32 and clamping the mobile terminal device.

When the mobile terminal device is fixed to the electric holder, the mobile terminal device is inevitably supported by the supporting surface 310, i.e., the mobile terminal device inevitably comes into contact with the supporting surface 310, and has a force effect with the supporting surface 310. Therefore, the first trigger unit 38a corresponding to the action of retracting the clamping arms 32 is arranged on the supporting surface 310, so that the clamping arms 32 automatically clamp the mobile terminal device through the action of placing the mobile terminal device on the supporting surface 310, which is simple in operation. Furthermore, since a force is inevitably applied on the movable block 312 when the mobile terminal device is placed on the supporting surface 310, as long as the first trigger unit 38a which is arranged corresponding to the movable block 312 is the touch switch, the first trigger unit 38a can be easily triggered, achieving low cost and obvious effect.

In other embodiments, the first trigger unit 38a may also be a pressure sensor, and has a trigger process similar to that of the touch switch. If the movable block 312 is not arranged, the first trigger unit 38a may also be an infrared sensor arranged on a surface of the supporting surface 310. When the mobile terminal is close to the supporting surface, the infrared sensor may be triggered by detecting a distance between the infrared sensor and the mobile terminal.

In other embodiments, as long as the first trigger unit 38a is coupled to the control unit 37, the arrangement position of the first trigger unit 38a is not limited to the supporting surface 310 of the shell 31. The first trigger unit 38a may also be arranged on other surfaces of the shell 31.

The second trigger unit 38b is located on the side surface of the shell 31. Since the user generally holds the mobile terminal device with a thumb and other fingers of one hand at the time of taking the mobile terminal device, the second trigger unit 38b is arranged on the side surface of the shell 31. The second trigger unit 38b may be triggered respectively by the thumb and other fingers of the user and is easy to be triggered simultaneously. Therefore, the operation is convenient and conforms to the use habit of the user.

Optionally, the second trigger unit 38b is arranged in a position between the clamping arms 32 and a bottom end of the shell 31, which further conforms to the use habit of the user. Moreover, when the user takes the mobile terminal device, the user can hold the lower half part of the mobile terminal device, thereby effectively preventing the mobile terminal device from sliding from the hand.

In other embodiments, as long as the second trigger unit 38b is coupled to the control unit 37, the arrangement position of the second trigger unit 38b is not limited to the side surface of the shell 31. The second trigger unit 38b may be arranged on other surfaces of the shell 31, and may also be arranged on the clamping arms 32 or a fixing and supporting part 34. It should be noted that since the second trigger unit 38b is used to stretch the clamping arms 32 under a condition that the mobile terminal device is located on the supporting surface 310, considering the use habit of the user, the second trigger unit 38b is optionally arranged on a surface other than the supporting surface 310 of the electric holder.

In other embodiments, the control unit 37 may prejudge whether the first trigger unit 38a or the second trigger unit 38b fails and control the electric holder to enter different operating modes. Specifically, when the first trigger unit 38a and the second trigger unit 38b operate normally, the control unit 37 controls the electric holder to enter a first operating mode. The first operating mode is as follows: when the first trigger unit 38a is triggered, the control unit 37 sends a positive rotation signal to the electric driving apparatus 36, so that the clamping arms 32 are retracted; and when the second trigger unit 38b is triggered, the control unit 37 sends a reverse rotation signal to the electric driving apparatus 36, so that the clamping arms 32 are stretched. When one of the first trigger unit 38a and the second trigger unit 38b (e.g., the first trigger unit 38a) fails, the control unit 37 controls the electric holder to enter a second operating mode. The second operating mode is as follows: whenever the second trigger unit 38b is triggered, the second trigger unit 38b sends a trigger signal to the control unit 37. A control signal sent by the control unit 37 at the time of receiving the trigger signal for an odd-numbered time is different from a control signal sent by the control unit 37 at the time of receiving the trigger signal for an even-numbered time. For example, when the control unit 37 receives the trigger signal for an odd-numbered time, the control unit 37 sends a positive rotation signal, so that the electric driving apparatus 36 rotates positively, so as to retract the clamping arms 32; and when the control unit 37 receives the trigger signal for an even-numbered time, the control unit 37 sends a reverse rotation signal, so that the electric driving apparatus 36 rotates reversely, so as to stretch the clamping arms 32. Alternatively, when the control unit 37 receives the trigger signal for an odd-numbered time, the control unit 37 sends a reverse rotation signal, so that the electric driving apparatus 36 rotates reversely, so as to stretch the clamping arms 32; and when the control unit 37 receives the trigger signal for an even-numbered time, the control unit 37 sends a positive rotation signal, so that the electric driving apparatus 36 rotates positively, so as to retract the clamping arms 32. Alternatively, when the second trigger unit 38b is triggered for an odd-numbered time, the second trigger unit 38b sends a retracting trigger signal to the control unit 37. When the control unit 37 receives the retracting trigger signal, the control unit 37 sends a positive rotation signal to the electric driving apparatus 36 so that the electric driving apparatus 36 rotates positively, so as to retract the clamping arms 32. When the second trigger unit 38b is triggered for an even-numbered time, the second trigger unit 38b sends a stretching trigger signal to the control unit 37. When the control unit 37 receives the stretching trigger signal, the control unit 37 sends a reverse rotation signal to the electric driving apparatus 36 so that the electric driving apparatus 36 rotates reversely, so as to stretch the clamping arms 32. Specific operating principles and processes of the operating modes have been described in detail in previous embodiments, and will not be repeated here.

In this way, when the electric holder includes two trigger units, even if one trigger unit fails, the electric holder can continue operating by means of the other trigger unit, thereby enhancing practicability and reliability of the electric holder.

Figure 6:
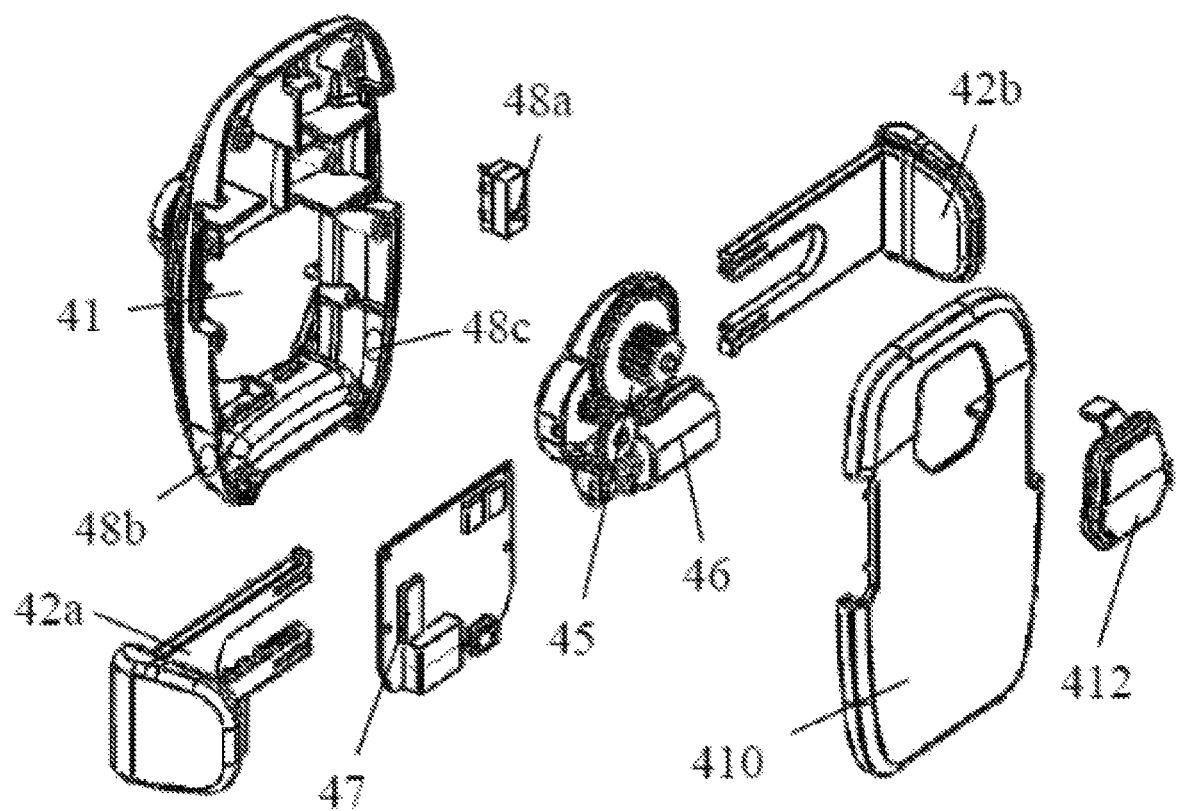
FIG. 6 is a three-dimensional exploded diagram illustrating an electric holder provided by another embodiment.

By referring to FIG. 6, FIG. 6 is a three-dimensional exploded diagram illustrating an electric holder provided by another embodiment. As shown in FIG. 6, the electric holder provided in the present embodiment includes a shell 41, a first clamping arm 42a, a second clamping arm 42b, a linkage mechanism 45, an electric driving apparatus 46, a control unit 47, a first trigger unit 48a, a second trigger unit 48b and a third trigger unit 48c. The electric driving apparatus 46 forms a linkage connection with the linkage mechanism 45. The control unit 47 is coupled to the electric driving apparatus 46. The first trigger unit 48a, the second trigger unit 48b and the third trigger unit 48c are coupled to the control unit 47. The shell 41 has a supporting surface 410 for supporting an article device. A movable block 412 is arranged in a region close to an upper part relative to the middle of the supporting surface 410. The movable block 412 may move back and forth along a direction perpendicular to the supporting surface 410. Two clamping arms of the electric holder are respectively a first clamping arm 42a and a second clamping arm 42b. The first clamping arm 42a and the second clamping arm 42b each forms a linkage connection with the linkage mechanism 45.

It can be understood that as long as the effect of clamping the mobile terminal device can be achieved, only one clamping arm in the first clamping arm 42a and the second clamping arm 42b (e.g., the first clamping arm 42a) can form the linkage connection with the linkage mechanism 45, while the second clamping arm 42b is fixed to the shell 41. As long as the linkage connection between the electric driving apparatus 46 and the linkage mechanism 45 and the linkage connection between the linkage mechanism 45 and the first clamping arm 42a and/or the second clamping arm 42b are formed, the linkage mechanism 45 may be a single gear or may be a gear set including two or more gears. Each gear may be a single-layer gear or a dual-layer gear, and will not be repeated here.

When the first trigger unit 48a is triggered, the control unit 47 controls the electric driving apparatus 46 to drive the linkage mechanism 45 positively, so that the first clamping arm 42a and the second clamping arm 42b move inwards, i.e., a pair of clamping arms are retracted. When the second trigger unit 48b and the third trigger unit 48c are simultaneously triggered, the control unit 47 controls the electric driving apparatus 46 to drive the linkage mechanism 45 reversely, so that the first clamping arm 42a and the second clamping arm 42b move outwards, i.e., the pair of clamping arms are stretched.

Specifically, when the first trigger unit 48a is triggered, the first trigger unit 48a sends a trigger signal to the control unit 47. The control unit 47 receives the trigger signal and sends a positive rotation signal to the electric driving apparatus 46. The electric driving apparatus 46 receives the positive rotation signal and starts to rotate positively to drive the linkage mechanism 45 to rotate positively, so as to drive the first clamping arm 42a and the second clamping arm 42b linked to the linkage mechanism 45 to move inwards, i.e., the first clamping arm 42a and the second clamping arm 42b move towards each other. When the second trigger unit 48b and the third trigger unit 48c are simultaneously triggered, the second trigger unit 48b and the third trigger unit 48c respectively send trigger signals to the control unit 47. When the control unit 47 simultaneously receives two trigger signals from the second trigger unit 48b and the third trigger unit 48c, the control unit 47 sends a reverse rotation signal to the electric driving apparatus 46. The electric driving apparatus 46 receives the reverse rotation signal and starts to rotate reversely to drive the linkage mechanism 45 to rotate reversely, so as to drive the first clamping arm 42a and the second clamping arm 42b linked to the linkage mechanism 45 to move outwards, i.e., the first clamping arm 42a and the second clamping arm 42b move away from each other.

The first trigger unit 48a may be a touch switch and corresponds to the movable block 412 arranged on the supporting surface 410 of the shell 41. When a force in the direction of the back surface of the shell 41 is applied on the movable block 412, the movable block 412 moves towards the back surface of the shell 41, abuts against and presses the first trigger unit 48a, so as to trigger the first trigger unit 48a. When the user needs to fix the mobile terminal device, the user may directly place the mobile terminal device on the supporting surface 410, and press the movable block 412 by applying a force by hand or through the weight of the mobile terminal device, so as to trigger the first trigger unit 48a, thereby automatically retracting the clamping arms 42 and clamping the mobile terminal device.

When the mobile terminal device is fixed to the electric holder, the mobile terminal device is inevitably supported by the supporting surface 410, i.e., the mobile terminal device inevitably comes into contact with the supporting surface 410, and has a force effect with the supporting surface 410. Therefore, the first trigger unit 48a corresponding to the action of retracting the clamping arms 42 is arranged on the supporting surface 410 so that the clamping arms 42 automatically clamp the mobile terminal device through such an action of placing the mobile terminal device on the supporting surface 410, which is simple in operation. Furthermore, since a force is applied to the movable block 412 inevitably when the mobile terminal device is placed on the supporting surface 410, as long as the first trigger unit 48a which is arranged corresponding to the movable block 412 is the touch switch, the first trigger unit 48a can be easily triggered, achieving low cost and obvious effect.

It can be understood that the first trigger unit 48a may also be arranged on a surface other than the supporting surface 410 of the shell 41, and may be selected from a pressure sensor or other sensors, which will not be repeated here.

The second trigger unit 48b and the third trigger unit 48c are arranged on respective sides of the shell 41. Optionally, the second trigger unit 48b and the third trigger unit 48c are arranged on respective side surfaces of the shell 41, and are located between the clamping arms 42 and a bottom end of the shell 41. When the user wants to take out the mobile terminal device which is clamped by the clamping arms 42, the user only needs to hold the mobile terminal device by hand in such a manner that two fingers (e.g., a thumb and a middle finger) naturally touch or press the second trigger unit 48b and the third trigger unit 48c located on respective sides of the shell 41, the second trigger unit 48b and the third trigger unit 48c can be simultaneously triggered, so as to stretch the clamping arms 42, thereby easily taking out the mobile terminal device.

The electric holder is designed to stretch the clamping arms 42 only by simultaneously triggering the second trigger unit 48b and the third trigger unit 48c, so as to ensure that the electric holder will not stretch the clamping arms 42 by mistake due to a false touch at one side, thereby effectively avoiding a condition that the clamping arms 42 are stretched by mistake due to the false touch on the holder and enhancing reliability and practicability of the electric holder. Meanwhile, since the user generally holds the mobile terminal device with a thumb and other fingers of one hand at the time of taking the mobile terminal device, the second trigger unit 48b and the third trigger unit 48c are respectively arranged on a left side and a right side of the shell 41 and may be triggered by the thumb and other fingers of the user, and can be simultaneously triggered easily. Therefore, the operation is convenient and conforms to a use habit of the user. Further, the second trigger unit 48b and the third trigger unit 48c are respectively arranged on the left side and the right side of the shell 41 and are located between the clamping arms 42 and the bottom end of the shell 41, which further conforms to the use habit of the user. Moreover, when the user takes the mobile terminal device, the user may hold a lower half part of the mobile terminal device, thereby effectively preventing the mobile terminal device from sliding from the hand.

It should be noted that, by taking two side surfaces with a larger linear distance as an upper side and a lower side and taking two side surfaces with a smaller linear distance as a left side and a right side, in other embodiments, both sides of the shell 41 provided with the second trigger unit 48b and the third trigger unit 48c may be different from both sides provided with the first clamping arm 42a and the second clamping arm 42b. For example, the electric holder may be designed to clamp the mobile terminal device from the upper side and the lower side of the mobile terminal device, i.e., the first clamping arm 42a and the second clamping arm 42b are respectively arranged on the upper side and the lower side of the shell 41. According to the use habit of the user, when taking out the mobile terminal device, the user is not accustomed to holding the upper side and the lower side of the mobile terminal device while is accustomed to holding the mobile terminal device from the left side and the right side of the mobile terminal device. Therefore, although the first clamping arm 42a and the second clamping arm 42b are respectively arranged on the upper side and the lower side of the shell 41, the second trigger unit 48b and the third trigger unit 48c shall be still arranged on the left side and the right side of the shell 41.

It can be understood that as long as the second trigger unit 48b and the third trigger unit 48c are coupled to the control unit 47, the arrangement positions of the second trigger unit 48b and the third trigger unit 48c are not limited to the side surfaces of the shell 41. The second trigger unit 48b and the third trigger unit 48c may also be arranged on other surfaces of the shell 41. It should be noted that since the second trigger unit 48b and the third trigger unit 48c are used to stretch the clamping arms 42 under a condition that the mobile terminal device is fixed to the supporting surface 410, considering the use habit of the user, the second trigger unit 48b and the third trigger unit 48c are optionally arranged on surfaces other than the supporting surface 410 of the electric holder.

In other embodiments, the second trigger unit 48b and the third trigger unit 48c may be touch switches of a same type, or sensors of a same type, or a touch switch and a sensor, or sensors of different types. Each sensor may be selected to be a pressure sensor, a touch sensor, an infrared sensor or a sound sensor. For example, when the second trigger unit 48b is a touch sensor, the second trigger unit 48b can be triggered only through light touch without a need of applying a force by a finger of the user.

In other embodiments, the control unit 47 may prejudge whether the first trigger unit 48a, the second trigger unit 48b or the third trigger unit 48c fails so as to control the electric holder to enter different operating modes. When the three trigger units operate normally, the control unit 47 controls the electric holder to enter a first operating mode. When the first trigger unit 48a is triggered, the control unit 47 sends a positive rotation signal to the electric driving apparatus 46 so that the electric driving apparatus 46 rotates positively to retract the clamping arms 42. When the second trigger unit 48b and the third trigger unit 48c are simultaneously triggered, the control unit 47 sends a reverse rotation signal to the electric driving apparatus 46 so that the electric driving apparatus 46 rotates reversely to stretch the clamping arms 42. When one of the three trigger units (e.g., the second trigger unit 48b) fails, the control unit 47 controls the electric holder to enter a second operating mode. When the first trigger unit 48a is triggered, the control unit 47 sends a positive rotation signal to the electric driving apparatus 46 so that the electric driving apparatus 46 rotates positively to retract the clamping arms 42. When the third trigger unit 48c is triggered, the control unit 47 sends a reverse rotation signal to the electric driving apparatus 46 so that the electric driving apparatus 46 rotates reversely to stretch the clamping arms 42. When two of the three trigger units fail (e.g., when only the third trigger unit 48c operates normally), the control unit 47 controls the electric holder to enter a third operating mode. Namely, when the third trigger unit 48c is triggered, the third trigger unit 48c sends a trigger signal to the control unit 47. A control signal (positive rotation signal or reverse rotation signal) sent by the control unit 47 at the time of receiving the trigger signal for an odd-numbered time is different from a control signal sent by the control unit 47 at the time of receiving the trigger signal for an even-numbered time.

When the third trigger unit 48c is triggered for an odd-numbered time, the third trigger unit 48c sends a trigger signal to the control unit 47. When the control unit 47 receives the trigger signal for the odd-numbered time, the control unit 47 sends a positive rotation signal to the electric driving apparatus 46 so that the electric driving apparatus 46 rotates positively, so as to retract the clamping arms 42. When the third trigger unit 48c is triggered for an even-numbered time, the third trigger unit 48c sends a trigger signal to the control unit 47. When the control unit 47 receives the trigger signal for the even-numbered time, the control unit 47 sends a reverse rotation signal to the electric driving apparatus 46 so that the electric driving apparatus 46 rotates reversely, so as to stretch the clamping arms 42. Alternatively, when the third trigger unit 48c is triggered for an odd-numbered time, the third trigger unit 48c sends a retracting trigger signal to the control unit 47. When the control unit 47 receives the retracting trigger signal, the control unit 47 sends a positive rotation signal to the electric driving apparatus 46 so that the electric driving apparatus 46 rotates positively, so as to retract the clamping arms 42. When the third trigger unit 48c is triggered for an even-numbered time, the third trigger unit 48c sends a stretching trigger signal to the control unit 47. When the control unit 47 receives the stretching trigger signal, the control unit 47 sends a reverse rotation signal to the electric driving apparatus 46 so that the electric driving apparatus 46 rotates reversely, so as to stretch the clamping arms 42. Specific operating principles and processes of the operating modes are described in detail in previous embodiments, and will not be repeated here.

In this way, when the electric holder includes three or more trigger units, even if several trigger units fail, as long as part of trigger units are normal, the electric holder can continue to operate by means of the part of trigger units, thereby enhancing practicability and reliability of the electric holder.

In such design, as long as one trigger unit in the electric holder can be operated normally, normal use of the electric holder is not affected, thereby enhancing practicability and reliability of the electric holder.

Figure 7:
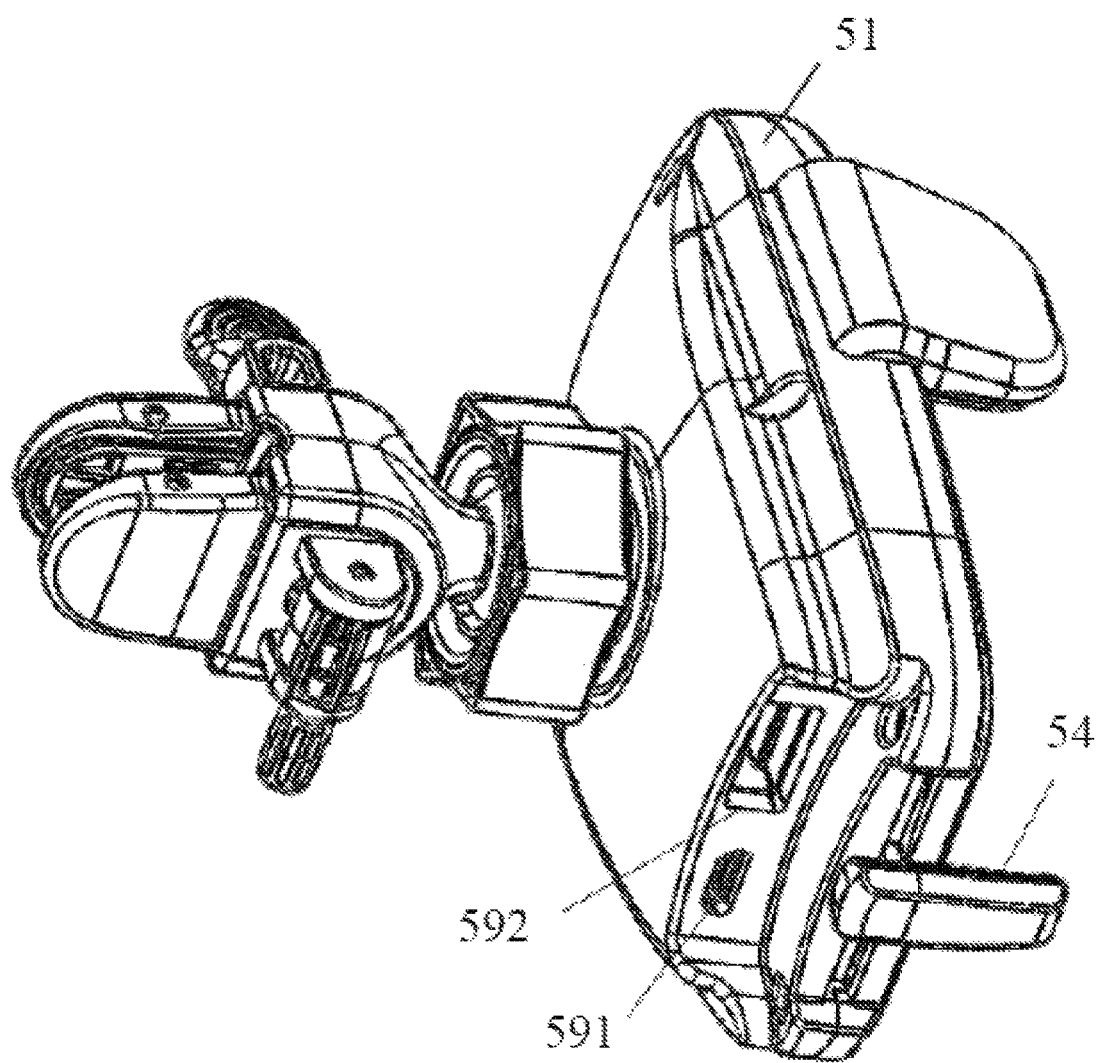
FIG. 7 is a three-dimensional structural diagram illustrating an electric holder provided by another embodiment.

By referring to FIG. 7, FIG. 7 is a three-dimensional combination diagram illustrating an electric holder in another embodiment. As shown in FIG. 7, the electric holder provided in the present embodiment includes a first interface 591 and a second interface 592 which are respectively an input unit and an output unit of the electric holder. The first interface 591 may serve as a power input interface and is connected to an external power supply through a power line for supplying electrical energy for the operation of the electric holder. For example, the input unit may obtain power from a cigarette lighter port through an on-board adaptor, or may obtain power from a mobile power pack, or may obtain power through an output port of a computer, an adapter or a wire in the vehicle and the like. Since the user often keeps one end of the power line connected to a powering port in the vehicle, when the power line is not used to charge other devices, the other end of the power line is free and has no space to place. Therefore, the power line is easy to swing and causes makes the interior of the vehicle disordered. The electric holder is equivalent to a fixed element. The other end of the power line is connected to the first interface 591 of the electric holder. As such, the power line is fixed, and the vehicle is cleaner.

The second interface 592 may serve as a power output interface and provides electric energy to the mobile terminal device. In the present embodiment, the first interface 591 and the second interface 592 are juxtaposed in a bottom of the shell 51. When the user places the mobile terminal device on the electric holder, the mobile terminal device may be connected to the second interface 592 through another power line and enters a charging state.

The electric holder in the present embodiment also includes a fixing and supporting part 54. The fixing and supporting part 54 is slidably fixed to a position close to the supporting surface on a bottom of the shell 51. When the user charges the mobile terminal device through the power line, the user may move the fixing and supporting part 54 to avoid a charging interface of the mobile terminal device, thereby enhancing practicability of the electric holder.

Figure 8:
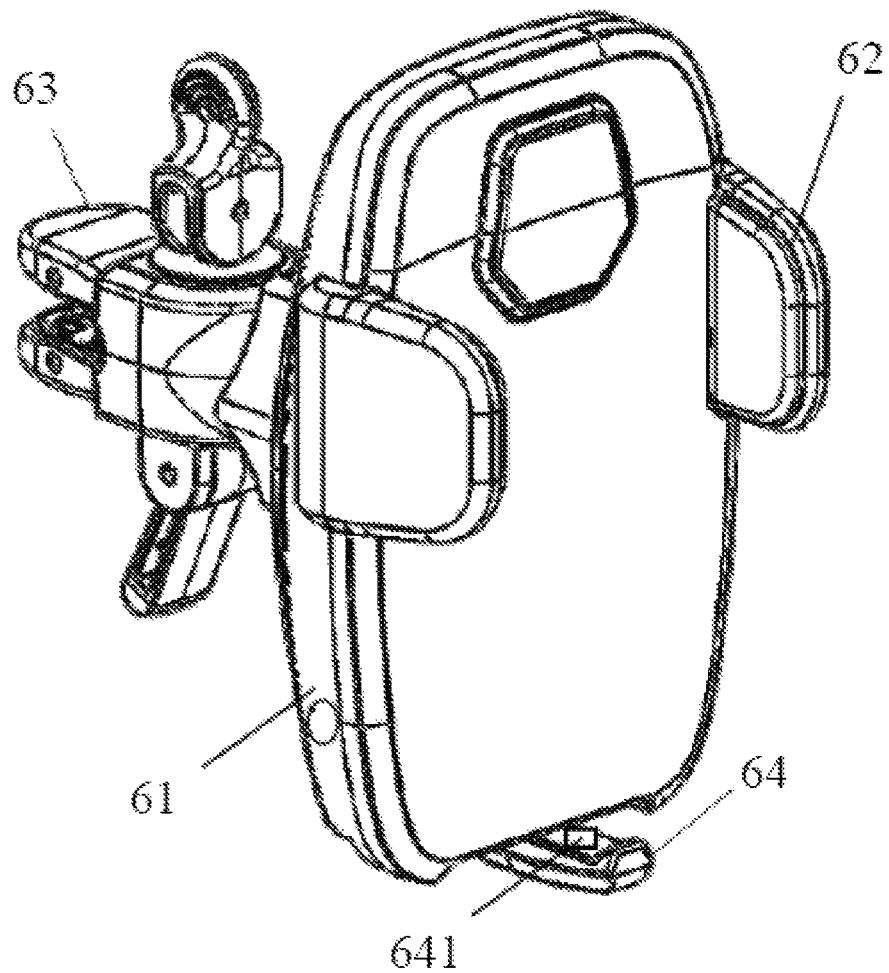
FIG. 8 is a three-dimensional structural diagram illustrating an electric holder provided by another embodiment.

By referring to FIG. 8, FIG. 8 is a three-dimensional combination diagram illustrating an electric holder in another embodiment. As shown in FIG. 8, the electric holder provided in the present embodiment includes a shell 61, a pair of clamping arms 62, a base 63 and a fixing and supporting part 64. The electric holder is also provided with a power input interface which is connected to an external power supply through a power linefor supplying electrical energy for the operation of the electric holder. For example, the input unit may obtain power from a cigarette lighter port through an on-board adaptor, or may obtain power from a mobile power pack, or may obtain power through an output port of a computer, an adapter or a wire in the vehicle and the like. The power line is connected to the power input interface, so that electric energy is supplied to the electric holder and the power line is fixed, thereby enhancing practicability of the electric holder.

The fixing and supporting part 64 is movably connected to the bottom of the shell 61, i.e., the fixing and supporting part 64 may slide in a horizontal plane or rotate in a vertical plane relative to the shell 61. The fixing and supporting part 64 is provided with an output connector 641. When the user intends to charge the mobile terminal device through the electric holder, the user may move or rotate the fixing and supporting part 64 to adjust the position of the output connector 641, so that the output connector 641 is aligned with a charging interface of the mobile terminal device. Then, the mobile terminal device is placed on the electric holder; and the output connector 641 is directly inserted into the charging interface of the mobile terminal device. In this way, the electric holder can charge the mobile terminal device without using another power line. Meanwhile, since the fixing and supporting part 64 is movable, the user places the mobile terminal device on the electric holder with one hand; and after the electric holder clamps the mobile terminal device, the user inserts the output connector 641 into the charging interface of the mobile terminal device with the same hand, thereby realizing complete one-hand operation, convenience and rapidness.

It can be understood that the output joint may be a Micro-USB connector, a Lightning connector, or a Type-C connector. Under a condition that the mobile terminal device has a magnetic attraction connector, the output connector may also be a magnetic output end which can be electrified.

In other embodiments, the electric holder may also include a wireless charging coil. Under a condition that the mobile terminal device has a wireless charging function, the electric holder may charge the mobile terminal device fixed to the electric holder through the wireless charging coil.

Optionally, the electric holder may also include a power supply unit. When the electric holder is not connected to the external power supply, the power supply unit individually supplies power for the control unit, the electric driving apparatus and the trigger unit, so as to prevent a condition that the electric holder cannot be used normally due to lack of electricity. For example, when a cigarette lighter has no electricity after parking and stalling, normal operation of the electric holder is ensured through the power supply unit, thereby avoiding a condition that the user cannot take out the mobile terminal device from the electric holder after parking. The power supply unit may be a replaceable dry battery, a lithium battery or a rechargeable battery, or may be a rechargeable battery arranged in the electric holder, and can be specifically selected according to actual needs.

Figure 9:
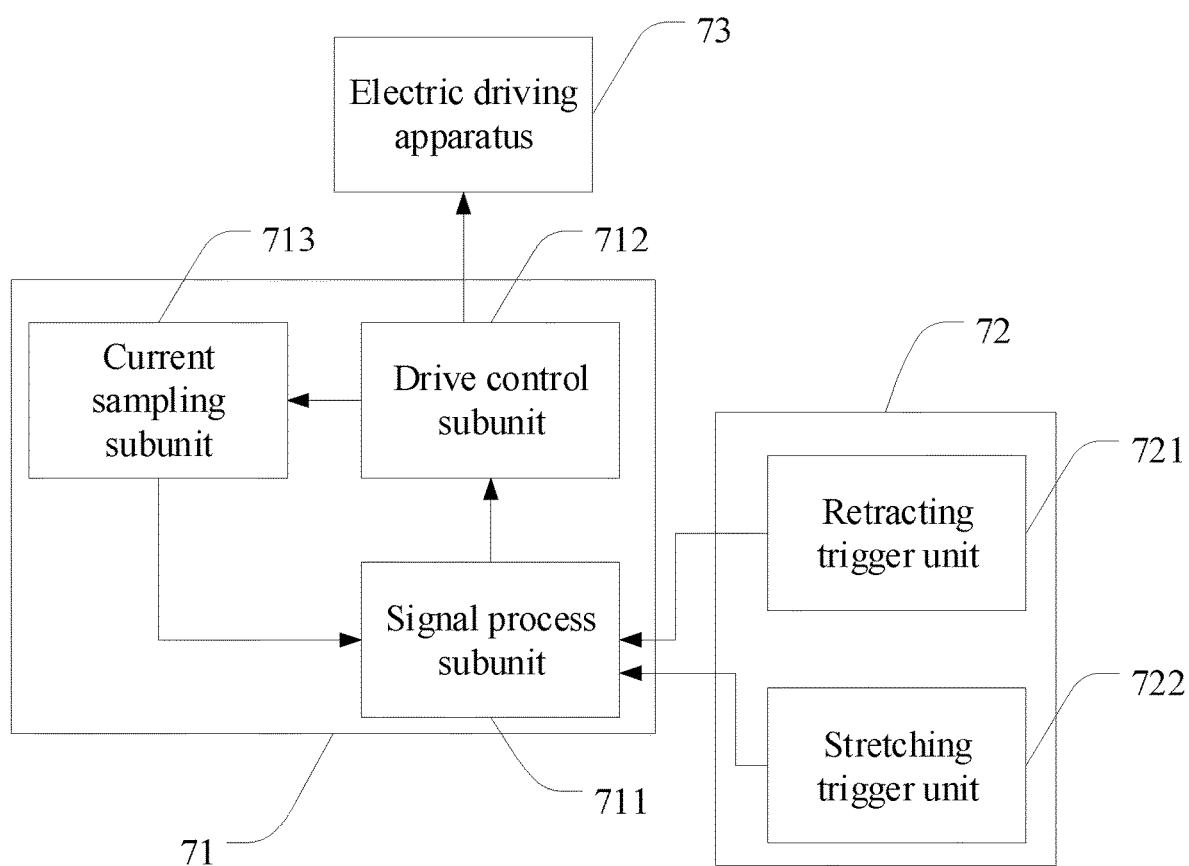
FIG. 9 is a schematic diagram illustrating the operating principle of an electric holder provided by another embodiment.

By referring to FIG. 9, FIG. 9 is a schematic diagram illustrating the operating principle of an electric holder in another embodiment of the present application. As shown in FIG. 9, the electric holder provided in the present application includes a control unit 71, trigger units 72 and an electric driving apparatus 73. The control unit 71 is electrically connected to the trigger units 72 and the electric driving apparatus 73 respectively. The control unit 71 includes a signal processing subunit 711 and a drive control subunit 712. The signal processing subunit 711 is configured to receive a signal sent by the trigger unit 72 when triggered and process the signal. The drive control subunit 712 is configured to send a control signal according to a result of the signal processing and control the operating mode of the electric driving apparatus 73.

The control unit 71 also includes a current sampling subunit 713. A current threshold is preset. When a pair of clamping arms are stretched or retracted to a limit (for example, when the limiting parts of the clamping arms engage with the stopping parts on the shell or the mobile terminal device is not required to be clamped, the clamping arms are retracted to the clamping parts and engage with the shell) or the mobile terminal device is clamped, the control unit 71 controls the electric driving apparatus 73 to stop driving. Specifically, the current sampling subunit 713 samples an operating current of the electric driving apparatus 73. When the operating current is greater than the preset threshold, the drive control subunit 712 controls the electric driving apparatus 73 to stop driving.

In the present embodiment, the number of the trigger units is two, and the trigger units are respectively a retracting trigger unit 721 and a stretching trigger unit 722. According to previous embodiments, it can be understood that the electric holder may include only one trigger unit and may also include at least two trigger units, which is not repeated here.

When the user needs to fix the mobile terminal device, the mobile terminal device is placed on the electric fixing bracket. The retracting trigger unit 721 is triggered to send a retracting trigger signal to the signal processing subunit 711. After receiving the retracting trigger signal, the signal processing subunit 711 determines that the electric driving apparatus 73 shall be controlled to rotate positively. The drive control subunit 712 sends a positive rotation signal to the electric driving apparatus 73. The electric driving apparatus 73 receives the positive rotation signal and then starts to rotate positively, so as to drive the clamping arms to retract. When the mobile terminal device is clamped, the clamping arms cannot continue retracting. At this moment, the electric driving apparatus 73 still drives positively, but cannot continue rotating. Therefore, the operating current of the electric driving apparatus 73 may be gradually increased. During the rotation of the electric driving apparatus 73, the current sampling subunit 713 continuously samples the operating current of the electric driving apparatus 73. When the sampled operating current is greater than the preset threshold, the signal processing subunit 711 determines that the electric driving apparatus 73 shall be controlled to stop driving. Then the drive control subunit 712 sends a stop signal to the electric driving apparatus 73 so that the electric driving apparatus 73 stops driving. The electric driving apparatus 73 has a worm which has a self-locking function. When the electric driving apparatus 73 stops driving, the clamping arms hold a state of clamping the mobile terminal device.

When the user needs to take out the mobile terminal device, the user touches the stretching trigger unit 722. The stretching trigger unit 722 is triggered and sends an stretching trigger signal to the signal processing subunit 711. After receiving the stretching trigger signal, the signal processing subunit 711 determines that the electric driving apparatus 73 shall be controlled to rotate reversely. Then the drive control subunit 712 sends a reverse rotation signal to the electric driving apparatus 73. The electric driving apparatus 73 receives the reverse rotation signal and then starts to rotate reversely, so as to drive the clamping arms to stretch. The user can thus take out the mobile terminal device from the electric holder. After the mobile terminal device leaves the electric holder, the clamping arms of the electric holder still continue stretching. When the limiting parts of the clamping arms engage with the stopping parts of the shell, the clamping arms cannot continue stretching, i.e., the clamping arms are stretched to a maximum limit. At this moment, the electric driving apparatus 73 still conducts reverse driving, but cannot continue rotating. The operating current of the electric driving apparatus 73 may also be gradually increased. The current sampling subunit 713 samples the operating current of the electric driving apparatus 73. When the sampled operating current is greater than the preset threshold, the signal processing subunit 711 determines that the electric driving apparatus 73 shall be controlled to stop driving; and then the drive control subunit 712 sends a stop signal to the electric driving apparatus 73 so that the electric driving apparatus 73 stops driving.

Through the current sampling subunit 713, the control unit 71 can control the electric driving apparatus 73 to stop driving timely when the current of the electric driving apparatus 73 is greater than a certain value, thereby saving the electric energy, protecting the circuit of the electric holder and ensuring service life of the electric holder.

It can be understood that, in other embodiments, the control unit 71 may also judge whether the electric driving apparatus 73 shall be controlled to stop driving according to driving time of the electric driving apparatus 73 instead of the operating current of the electric driving apparatus 73.

The electric holder in the present application judges whether a purpose of the user is to fix the mobile terminal device or take out the mobile terminal device through the trigger units 72, so that the electric driving apparatus 73 drives positively or reversely, so as to drive the clamping arms to retract or stretch, thereby clamping or releasing the mobile terminal device and realizing intelligent driving of the clamping arms. The electric holder in the present application is simple in operation and easy in one-hand operation. During clamping and releasing the mobile terminal device, the user does not need to move the clamping arms with hand, thereby realizing high intelligent degree and automation degree and enhancing safety and convenience of using the electric holder during driving for the user.

After drawings and detailed description are read and understood, other aspects can be understood.

INDUSTRIAL APPLICABILITY

The electric holder in the present application is simple in operation and easy in one-hand operation; and in the process of clamping or releasing the mobile terminal device, the user does not need to move the clamping arms with hand, thereby realizing high intelligent degree and automation degree and enhancing safety and convenience of using the electric holder during driving for the user.

What is claimed is:

1. An electric holder, comprising:
    a shell;
    a pair of clamping arms;
    a linkage mechanism, which forms a linkage connection with at least one clamping arm of the pair of clamping arms;
    an electric driving apparatus which forms a linkage connection with the linkage mechanism;
    a control unit, which is coupled to the electric driving apparatus; and
    at least one trigger unit, which is coupled to the control unit,
    wherein when the trigger unit is triggered, the control unit controls the electric driving apparatus to drive the linkage mechanism, so as to move the at least one clamping arm of the pair of clamping arms that forms the linkage connection with the linkage mechanism.

2. The electric holder according to claim 1, wherein the electric holder comprises one trigger unit, wherein
    when the trigger unit is triggered for odd-numbered times, the control unit controls the electric driving apparatus to drive the linkage mechanism positively, so as to move the at least one clamping arm of the pair of clamping arms inwards; and when the trigger unit is triggered for even-numbered times, the control unit controls the electric driving apparatus to drive the linkage mechanism reversely, so as to move the at least one clamping arm of the pair of clamping arms outwards; or
    when the trigger unit is triggered for even-numbered times, the control unit controls the electric driving apparatus to drive the linkage mechanism positively, so as to move the at least one clamping arm of the pair of clamping arms inwards; and
    when the trigger unit is triggered for odd-numbered times, the control unit controls the electric driving apparatus to drive the linkage mechanism reversely, so as to move the at least one clamping arm of the pair of clamping arms outwards.

3. The electric holder according to claim 1, wherein the electric holder comprises two trigger units, wherein when one of the trigger units is triggered, the control unit controls the electric driving apparatus to drive the linkage mechanism positively, so as to move the at least one clamping arm of the pair of clamping arms inwards; and when the other one of the trigger units is triggered, the control unit controls the electric driving apparatus to drive the linkage mechanism reversely, so as to move the at least one clamping arm of the pair of clamping arms outwards.

4. The electric holder according to claim 3, wherein the one of the trigger units is located on a supporting surface of the shell, and the other one of the trigger units is located on a surface of the shell other than the supporting surface.

5. The electric holder according to claim 1, wherein the electric holder comprises three trigger units, wherein when one of the trigger units is triggered, the control unit controls the electric driving apparatus to drive the linkage mechanism positively, so as to move the at least one clamping arm of the pair of clamping arms inwards; and when the other two trigger units are simultaneously triggered, the control unit controls the electric driving apparatus to drive the linkage mechanism reversely, so as to move the at least one clamping arm of the pair of clamping arms outwards.

6. The electric holder according to claim 5, wherein the one of the trigger units is located on a supporting surface of the shell, and the other two of the trigger units are respectively located on two side surfaces of the shell which are separated with a small distance.

7. The electric holder according to claim 3, wherein the control unit judges whether the trigger unit fails and controls the electric holder to enter different operating modes.

8. The electric holder according to claim 1, wherein the electric holder further comprises a base connected to the shell; and the control unit and/or the trigger unit is arranged in the base.

9. The electric holder according to claim 3, wherein the linkage mechanism comprises a gear; a first clamping arm of the pair of clamping arms comprises a first clamping part and a first connecting part connected to the first clamping part; a first accommodating groove is formed at one end of the first connecting part away from the first clamping part; the first accommodating groove has a first side surface; the first side surface has a tooth shape and engages with the gear.

10. The electric holder according to claim 9, wherein a second clamping arm of the pair of clamping arms comprises a second clamping part and a second connecting part connected to the second clamping part; a second accommodating groove is formed at one end of the second connecting part away from the second clamping part; the second accommodating groove has a second side surface opposite to the first side surface; the second side surface has a tooth shape and engages with the gear.

11. The electric holder according to claim 9, wherein the first connecting part is provided with a limiting part.

12. The electric holder according to claim 3, wherein when the pair of clamping arms moves outwards or inwards to reach a limit or to clamp a to-be-fixed article, the control unit controls the electric driving apparatus to stop driving.

13. The electric holder according to claim 12, wherein the control unit comprises:
  a current sampling subunit, which is configured to sample an operating current of the electric driving apparatus; and
  a drive control subunit, which is configured to control the electric driving apparatus to stop driving when the operating current is greater than a preset threshold.

14. The electric holder according to claim 1, wherein the electric holder further comprises an input unit and an output unit, the input unit and the output unit are respectively arranged on the shell of the electric holder, the output unit is selected from a group consisting of: a USB interface, a magnetic attraction joint, and a wireless charging coil.

15. The electric holder according to claim 14, wherein the electric holder further comprises a fixing and supporting part, the fixing and supporting part is arranged on a bottom end of the shell and is movably connected to the shell, the output unit is an output connector arranged on the fixing and supporting part.

16. The electric holder according to claim 1, wherein the electric holder further comprises a power supply unit, the power supply unit individually provides electric energy for the control unit, the electric driving apparatus and the trigger unit.

17. The electric holder according to claim 5, wherein the control unit judges whether the trigger unit fails and controls the electric holder to enter different operating modes.

18. The electric holder according to claim 5, wherein the linkage mechanism comprises a gear; a first clamping arm of the pair of clamping arms comprises a first clamping part and a first connecting part connected to the first clamping part; a first accommodating groove is formed at one end of the first connecting part away from the first clamping part; the first accommodating groove has a first side surface; the first side surface has a tooth shape and engages with the gear.

19. The electric holder according to claim 18, wherein a second clamping arm of the pair of clamping arms comprises a second clamping part and a second connecting part connected to the second clamping part; a second accommodating groove is formed at one end of the second connecting part away from the second clamping part; the second accommodating groove has a second side surface opposite to the first side surface; the second side surface has a tooth shape and engages with the gear.

20. The electric holder according to claim 10, wherein the second connecting part is provided with a limiting part.

* * * * *